(12) United States Patent
West et al.

(10) Patent No.: US 6,887,619 B2
(45) Date of Patent: May 3, 2005

(54) CROSS-LINKED POLYSILOXANES

(75) Inventors: Robert C. West, Madison, WI (US);
Zhengcheng Zhang, Madison, WI (US)

(73) Assignee: Quallion LLC, Sylmar, CA (US)

( * ) Notice: Subject to any disclaimer, the term of this patent is extended or adjusted under 35 U.S.C. 154(b) by 0 days.

(21) Appl. No.: 10/367,013

(22) Filed: Feb. 13, 2003

(65) Prior Publication Data

US 2003/0198869 A1 Oct. 23, 2003

Related U.S. Application Data

(60) Provisional application No. 60/374,374, filed on Apr. 22, 2002.

(51) Int. Cl.$^7$ ................................................ H01M 6/18
(52) U.S. Cl. ...................... 429/189; 429/313; 29/623.1; 29/623.5
(58) Field of Search ............................. 29/623.1, 623.5; 429/189, 313; 252/62.2

(56) References Cited

U.S. PATENT DOCUMENTS

| | | |
|---|---|---|
| 5,272,021 A | 12/1993 | Asai et al. |
| 5,300,375 A | 4/1994 | Chaloner-Gill |
| 5,362,493 A | 11/1994 | Skotheim et al. |
| 5,538,812 A | 7/1996 | Lee et al. |
| 5,609,974 A | 3/1997 | Sun |
| 5,633,098 A | 5/1997 | Narang et al. |
| 5,690,702 A | 11/1997 | Skotheim et al. |
| 5,700,300 A | 12/1997 | Jensen et al. |
| 5,731,104 A | 3/1998 | Ventura et al. |
| 5,753,389 A | 5/1998 | Gan et al. |
| 5,772,934 A | 6/1998 | MacFadden |
| 5,882,812 A | 3/1999 | Visco et al. |
| 5,885,733 A | 3/1999 | Ohsawa et al. |
| 6,168,885 B1 | 1/2001 | Narang et al. |
| 6,248,481 B1 | 6/2001 | Visco et al. |
| 6,447,952 B1 | 9/2002 | Spiegel et al. |
| 6,495,287 B1 | 12/2002 | Kolb et al. |

(Continued)

FOREIGN PATENT DOCUMENTS

| | | |
|---|---|---|
| EP | 0 450 981 A1 | 10/1991 |
| EP | 0 526 728 A1 | 2/1993 |
| EP | 0 581 296 A3 | 2/1994 |

(Continued)

OTHER PUBLICATIONS

Y. Kang et al., Solid Polymer Electrolytes based on Cross–linked Siloxane–g–ollgoethylene oxide: Ionic conductivity and Electrochemical Properties, Abstract book of 11th International Meeting on Lithium Batteries (IMLB 11), Jun. 23–28, 2002.

Y. Kang et al., Solid Polymer Electrolytes Based on Cross–Linked Polysiloxane–g–oligo (ethylene oxide): Ionic Conductivity and Electrochemical Properties, Journal of Power Sources 118–121 (Jun. 1, 2003), pp. 448–453.

International Search Report, dated Mar. 1, 2003, received in relation to Application No. PCT/US03/02127.

B. Oh et al., New Electrolyte Network–Type Siloxane Polymer Electrolyte, Electrochemical and Solid State Letters, 2002, E59–E61, 5(11), The Electrochemical Society, Inc., no month.

International Search Report dated Sep. 12, 2003, received in relation to Application No. PCT/US03/08784.

International Search Report, dated Oct. 9, 2003, received in relation to Application No. PCT/US03/08783.

International Search Report, dated Oct. 9, 2003, recieved in relation to Application No. PCT/US03/09779.

*Primary Examiner*—Susy Tsang-Foster

(57) ABSTRACT

Disclosed herein are cross-linked polysiloxane polymers having oligooxyethylene side chains. Lithium salts of these polymers can be synthesized as a liquid and then caused to solidify in the presence of elevated temperatures to provide a solid electrolyte useful in lithium batteries.

31 Claims, 5 Drawing Sheets

U.S. PATENT DOCUMENTS

| | | |
|---|---|---|
| 6,573,009 B1 | 6/2003 | Noda et al. |
| 6,610,109 B2 | 8/2003 | Noh |
| 6,653,015 B2 | 11/2003 | Yoshida et al. |
| 2002/0051911 A1 | 5/2002 | Okada |
| 2002/0192554 A1 | 12/2002 | Woo et al. |
| 2003/0036003 A1 | 2/2003 | Shchori et al. |
| 2003/0099884 A1 | 5/2003 | Chiang et al. |
| 2003/0104282 A1 | 6/2003 | Xing et al. |
| 2003/0180624 A1 | 9/2003 | Oh et al. |
| 2003/0180625 A1 | 9/2003 | Oh et al. |

FOREIGN PATENT DOCUMENTS

| | | |
|---|---|---|
| EP | 0 581 296 A2 | 2/1994 |
| EP | 0 450 981 B1 | 6/1995 |
| EP | 0 932 215 A1 | 1/1999 |
| EP | 0 796 511 B1 | 8/1999 |
| EP | 1 024 502 A1 | 8/2000 |
| EP | 0 932 215 B1 | 5/2001 |
| EP | 1 202 374 A1 | 5/2002 |
| JP | 57-034681 | 2/1982 |
| JP | 57-034682 | 2/1982 |
| JP | 57-080670 | 5/1982 |
| JP | 57-11957 | 7/1982 |
| JP | 57-176659 A2 | 10/1982 |
| JP | 59-224072 A2 | 12/1984 |
| JP | 60-195877 | 10/1985 |
| JP | 60-216461 | 10/1985 |
| JP | 61-288374 | 12/1986 |
| JP | 62-209169 A2 | 9/1987 |
| JP | 63-01068 | 1/1988 |
| JP | 63-310569 | 12/1988 |
| JP | 02/080462 | 3/1990 |
| JP | 02/262274 | 10/1990 |
| JP | 02/291603 | 12/1990 |
| JP | 03-139586 | 6/1991 |
| JP | 05-036441 | 2/1993 |
| JP | 05-290816 | 11/1993 |
| JP | 07-320782 | 12/1995 |
| JP | 08-078053 A2 | 3/1996 |
| JP | 09-308844 | 11/1997 |
| JP | 10-172616 A2 | 6/1998 |
| JP | 11-214032 A2 | 1/1999 |
| JP | 11-302384 A2 | 4/1999 |
| JP | 11-18504 | 7/1999 |
| JP | 11-238523 | 8/1999 |
| JP | 11-302383 | 11/1999 |
| JP | 11-306856 A2 | 11/1999 |
| JP | 11-306857 A2 | 11/1999 |
| JP | 2000-058123 | 2/2000 |
| JP | 2000-154254 A2 | 6/2000 |
| JP | 2000-22939 A2 | 8/2000 |
| JP | 2000-277152 A2 | 10/2000 |
| JP | 2001-068115 | 3/2001 |
| JP | 2001-110455 A2 | 4/2001 |
| JP | 2001-185165 A2 | 7/2001 |
| JP | 2001-283907 A2 | 10/2001 |
| JP | 2001-283913 | 10/2001 |
| JP | 2002-063936 A2 | 2/2002 |
| JP | 2002-151150 A2 | 5/2002 |
| JP | 2002 155142 A2 | 5/2002 |
| JP | 2002-298913 A2 | 10/2002 |
| JP | 2002-343440 A2 | 11/2002 |
| JP | 2003-002974 A2 | 1/2003 |
| WO | WO 96/21853 | 7/1996 |
| WO | WO 00/08854 | 2/2000 |
| WO | WO 01/73884 A1 | 10/2001 |
| WO | WO 03/083970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

Crosslinked Polysiloxane Polymer Network

CROSS-LINKED POLYSILOXANES

CROSS-REFERENCE TO RELATED APPLICATIONS

This application claims priority to U.S. Provisional Patent Application Ser. No. 60/374,374, filed on Apr. 22, 2002, entitled "Cross-Linked Polysiloxanes" and incorporated by reference herein in its entirety.

STATEMENT REGARDING FEDERALLY SPONSORED RESEARCH/DEVELOPMENT

This invention was made with United States government support awarded by NIST 144 LM01, Subcontract number AGT DTD Sep. 9, 2002. The United States has certain rights in this invention.

BACKGROUND

The present invention relates to cross-linked siloxane polymers capable of being formed in a liquid reaction medium and solidified by heating. It also relates to the use of such polymers with salts (such as lithium salts) to create electrically conductive materials for use in batteries and the like.

Lithium batteries are used in medical devices, wristwatches, cell phones, and computers, and are of interest for powering electrically powered automobiles. They are particularly desirable because they deliver high levels of power per unit weight. However, conventional lithium batteries typically contained a liquid (such as polyethylene oxide) that acted as an electrolyte. If such batteries were to be used in automobiles or in an implanted medical device, there would be some risk that the liquid might leak, with resulting safety and environmental concerns.

For the above reasons, there is a need for solid electrolytes suitable for use with batteries.

SUMMARY

In one aspect the present invention provides a cross-linked polysiloxane having at least one main chain segment in which "m" of the silicons are linked to one or more side chains that include an oligo (ethylene glycol). (See FIG. 1.) The oligo (ethylene glycol) can be selected from the group consisting of side chains of the formula: —$(CH_2)_3$—O—$(CH_2CH_2O)_p$—$R_1$. In this formula p is at least 2 and less than 20 (preferably between 2 and 13), and $R_1$ is alkyl having less than 10 carbons (preferably methyl).

The polysiloxane also includes "n" silicons linked to a cross-linker that includes a moiety selected from a group having the formula O—$(CH_2CH_2O)_q$ and Si—O—$(Si—O)_k$—Si. (See FIG. 5.) Preferably, q is at least 4 and less than 30 and k is at least 5 and less than 30. The ratio of n:m can be in a range of 1:4 to 1:200, in a range of 1:6 to 1:100, or in a range of 1:6 to 1:70.

In some instances, at least a portion of the m silicons and/or at least a portion of the n silicons are bound to an alkyl group. Alkyl groups linked to the n silicons and/or to the m silicons can include less than 10 carbons. One or more of the m silicons can be linked to a plurality of side chains that each includes an oligomer. The n+m silicons can be less than or equal to the total number of silicons in the main chain of the polysiloxane.

The total silicons in the main chain are preferably between 8 and 300. The n silicons can be less than 50%, less than 20%, or less than 5% of the total number of silicons in the main chain. Additionally, the n silicons can be more than 0.5% of the total number of silicons in the main chain silicons. The m silicons can be greater than 50%, greater than 80%, or greater than 96% of the total number of silicons in the main chain.

The polysiloxanes can be terminated on their main chain by any of the known termination groups that are conventional with polysiloxane electrolytes (most preferably a silyl group such as trimethyl silyl).

If the cross linker includes a moiety with the structure Si—O—$(Si—O)_k$—Si, each of the silicons in the moiety can also be linked to two alkyl groups. In some instances, the alkyl groups are methyl groups.

These compounds are primarily intended for use in mixtures with salts. Lithium salts of the type conventionally used with polysiloxane electrolytes are highly preferred. It is typically desired to have an excess of ethylene glycol repeating units relative to lithium cations. A suitable ratio for glycol repeating units relative to lithium cations includes, but is not limited to, ratios in the range of 12:1 to 40:1 and 20:1 to 40:1.

These compounds are capable of being synthesized as a liquid (e.g. at room temperature), and then converted to a solid film or other solid by heating at between 50° C. and 150° C. Preferably, the liquid is capable of solidifying upon being heated to a temperature of less than 100° C.

Thus, in another form the invention provides methods of forming such compounds. One reacts a polysiloxane (having some silicons in its main chain bonded to a hydrogen and other silicons in its main chain bonded to at least one of the aforesaid side chains) with a cross-linking agent. The cross-linking agent has the following formula, $CH_2$=CH—$CH_2$—$R_3$—$CH_2$—CH=$CH_2$, where $R_3$ is a moiety selected from the group consisting of O—$(CH_2CH_2O)_q$ and Si—O—$(Si—O)_k$—Si, where q is at least 4 and less than 30, and k is at least 5 and less than 30.

The "free" side chains in the final product provide binding sites for the lithium cations. They promote the electroconductivity. The reaction mixture can remain liquid when it is first formed, but will solidify under moderate heating as the moderate heating causes the cross-linking. Thus, the compositions can be synthesized in a batch production process and then be transported into battery housings. The housings can double as mold housings as the battery housings (with electrolyte inside) can be heated at relatively moderate temperatures to create a solid internal electrolyte.

Thus, the invention provides a method of forming a solid cross-linked polysiloxane that will conduct electricity. It involves heating a liquid compound of the above type until it forms a solid that remains a solid at room temperature.

Advantages of the present invention therefore include providing solid electrolytes useful in lithium batteries, providing techniques for efficiently forming these electrolytes from a liquid, and providing such electrolytes with good mechanical strength, excellent thermal and electrochemical stability and high room temperature conductivity.

These materials can be easily synthesized, poured into the final battery or other housing, and then heated to fix them in form. Alternatively, they can be poured over a surface to a specific depth, and then heated to create a thin film of conducting electrolyte.

Another advantage of the present invention is that these materials can be synthesized efficiently from known, readily obtainable materials.

These and still other advantages of the present invention will be apparent from the description that follows. The following description is merely of the preferred embodiments. The claims should therefore be looked to in order to understand the full scope of the invention.

DESCRIPTION OF THE PREFERRED EMBODIMENTS

Figure 1:
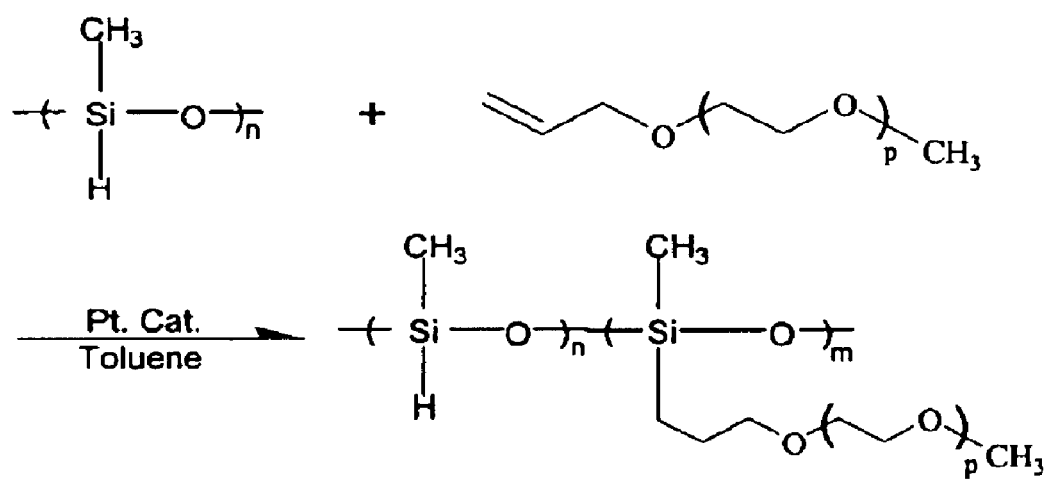
FIG. 1 depicts in schematic form a synthesis of a first type of precursor polysiloxane.

We describe creation of polysiloxane polymers having a plurality of main siloxane chain silicons linked to at least one oligomer side chain and a plurality of main siloxane chain silicons linked to a hydrogen available for use in a later cross-linking reaction. We describe the creation of cross-linking agents based on either polyethylene oxide main chain portions (with available unsaturated carbon ends) or siloxane main chain portions (with available unsaturated carbon ends).

We also describe the use of such cross-linking agents to create cross-linked polysiloxane material (with or without lithium salt doping).

We also describe testing of the conductivity of our electrolytes, a technique for controlling the speed of the cross-linking reaction, and techniques for turning the liquid cross-linked polysiloxane into a solid.

EXAMPLE 1

We created a polysiloxane having most of the silicons in the main siloxane chain being bound to a single methyl group and also a single oligo(ethylene glycol) side chain. However, some of the silicons in the main siloxane chain instead were bound to a single methyl group and also to hydrogen. For Example 1, the ratio of n:m (see FIG. 1) was about 1:14 and p was 3.

In our synthesis, an oven-dried three-neck 500 mL flask was flame-vacuumed and then filled with $N_2$. This process was repeated 3 times.

Polymethylhydrosiloxane (PMHS, 30 g, 0.5 mol, Gelest) was syringed into the flask, then 300 mL of distilled toluene was added along with tri(ethylene glycol)allyl methyl ether (102 g, 0.5 mol), and Karlstedt's catalyst (platinum-divinyltetramethyl-disiloxane) (100 ppm, ~2% in xylene). The reaction solution was heated to 60° C. for 24 hours, and cooled to room temperature.

The solvent was removed under reduced pressure, and the resulting colorless or yellowish viscous oil was washed at least 6 times with hexanes until there were no signals for tri(ethylene glycol)allyl methyl ether and its isomers detected in the $^1$H-NMR spectrum. The lower layer was collected and dissolved in dry toluene to make a dilute solution, which was then passed through a silica gel column to remove the trace of platinum catalyst.

Afterwards, all volatile residues were removed under vacuum. The final single branched polysiloxane was a colorless, viscous liquid. The yield was about 90%. A GPC trace of this material showed one peak. The n:m ratio (1:14) was determined by the integration area of Si—H at 4.6 ppm to Si—$CH_3$ at 0.3 ppm from $^1$H-NMR measurement.

EXAMPLE 2

For Example 2 we created the FIG. 1 polysiloxane where the ratio of n:m was about 1:30 and p was 3.

Polymethylhydrosiloxane (PMHS, 30 g, 0.5 mol, Gelest) was placed in a 500 mL flask which was flame-vacuumed and then filled with $N_2$ for three times, then 300 mL of distilled toluene was added along with tri(ethylene glycol) allyl methyl ether (122.4 g, 0.6 mol (20% excess)) and Karlstedt's catalyst (120 ppm, ~2% in xylene solution).

The reaction solution was stirred and heated to 60° C. for 48 hours and then cooled to room temperature. The toluene was removed under reduced pressure, resulting in a colorless viscous oil which was washed at least 6 times with hexanes until no tri(ethylene glycol)allyl methyl ether and its isomers signals were detected in $^1$H-NMR spectrum. The lower layer was collected and dissolved in dry toluene to make a dilute solution, which was then passed through a silica gel column to remove the trace of platinum catalyst.

All volatiles were then removed under vacuum. The final single branched polysiloxane was a colorless, viscous liquid. The yield was about 80%. A GPC trace of this material showed one peak. The n:m ratio (1:30) was determined by the integration area of Si—H at 4.6 ppm to Si—$CH_3$ at 0.3 ppm from $^1$H-NMR measurement.

EXAMPLE 3

For Example 3 we created the FIG. 1 polysiloxane where the ratio of n:m was about 1:70 and p was 3.

Polymethylhydrosiloxane (PMHS, 30 g, 0.5 mol, Gelest) was placed in a 500 ml flask which was flame-vacuumed and then filled with $N_2$ for three times, then 300 ml of distilled toluene was added along with tri(ethylene glycol)allyl methyl ether (142.8 g, 0.7 mol (40% excess)) and Karlstedt's catalyst (120 ppm, ~2% in xylene solution).

The reaction solution was stirred and heated to 60° C. for at least 48 hours and then cooled down to room temperature. The toluene was removed under reduced pressure, and the polymer was rinsed with hexane for at least 10 times to remove excess allyl ether and the isomers (no allyl ether and isomers were detected in the proton NMR spectrum). After passing through a silica gel column to get rid of the trace amount of platinum catalyst, the final single branched polysiloxane was a colorless, viscous liquid (yield is about 75%). A GPC trace of this material showed one peak. The n:m ratio (1:70) was determined by the integration area of Si—H at 4.6 ppm to Si—$CH_3$ at 0.3 ppm from $^1$H-NMR measurement.

EXAMPLE 4

For Example 4 we created the FIG. 1 polysiloxane where the ratio of n:m was about 1:8 and p was 7.2.

Polymethylhydrosiloxane (12.0 g, 0.2 mol) was placed in a 250 mL 3-neck flask that was vacuum/flame dried 3 times in advance. 150 ml of dried toluene was added along with oligo(ethylene glycol)allyl methyl ether (mw~390) (70.2 g, 0.18 mol) and Karlstedt's catalyst (200 ppm, ~2% in xylene solution). The solution was heated to 65° C. for one day, and the polymer was washed with hexane to remove the excess allyl ether. The result was a light yellowish, viscous liquid (yield is about 90%).

EXAMPLE 5

Figure 2:
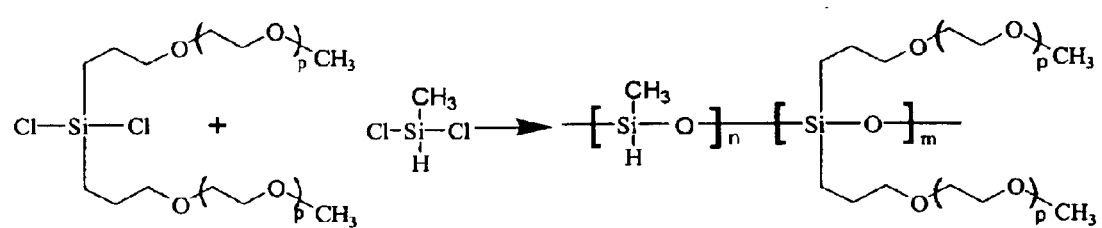
FIG. 2 depicts in schematic form a synthesis of a second type of precursor polysiloxane.

For Example 5 we replaced the methyl with an additional side chain to create the FIG. 2 polysiloxane where the ratio of n:m was about 1:6 and p was 3.

As a first step we created the dichlorosilane with two side chains. Tri(ethylene glycol)allyl methyl ether (20.5 g, 0.1 mol) was added with 50 mL of dry THF to a Schlenk flask fitted with a screw top Teflon® stopper. The mixture was cooled briefly in liquid nitrogen. Then dichlorosilane (20 g, 0.05 mol, 25% solution in xylene) was syringed into the flask.

Hexachloroplatinic acid (200 ppm, 0.05 g/mL solution in isopropanol) was added to the mixture. The flask was sealed, and the mixture was frozen using liquid nitrogen. Once the mixture was completely frozen, a vacuum was pulled on the flask. The flask was then resealed and allowed to warm to room temperature at which time it was heated to 60° C. for at least 24 hours. A yellowish tint to the solution indicated that the reaction was finished.

A vacuum was pulled on the reaction to remove any remaining dichlorosilane. Conversion was measured by IR spectroscopy and $^1$H-NMR. The Si—H displays a characteristic IR absorption at 2160 cm$^{-1}$ and $^1$H-NMR peak at 5.5 ppm for dichlorosilane or 4.5 ppm for dichloromonoalkylsilane. Additionally, the tri(ethylene glycol)allyl methyl ether shows an olefinic absorption at 1650 cm$^{-1}$. The reaction was considered complete when no Si—H could be detected. The polymer was heated under vacuum to remove unreacted allyl methyl ether. The result was a yellowish liquid (yield 98%). $^1$H-NMR and $^{29}$Si-NMR confirmed the correct product.

As a second step, we performed cohydrolysis of the two dichlorides as shown in FIG. 2. In this regard, a magnetic stir bar was placed in a flame dried 100 mL 3-neck flask. Dichloromethane (dry, 10 mL), dichlorodi(2-(2-(2-methoxyethoxy)ethoxy)ethoxy)propylsilane (5.08 g, 0.01 mol) and dichloromethylsilane (0.23 g, 0.002 mol) were added to the flask. Triethyl amine (2.424 g, 0.022 mol) together with excess water (~1.0 g) was added into the mixture by dropping funnel.

A white fog was immediately produced. The solution was stirred for 12 hours, then filtered to remove the white ammonium salt crystals. The viscous polymer was then dissolved in toluene, and passed through a silica gel column. The result was a yellowish viscous oil, which was dried with anhydrous MgSO$_4$. The $^1$H-NMR spectrum showed a signal at 4.7 ppm (Si—H), and 0.45 ppm (4H), 1.5 ppm (4H), 3.3–3.75 ppm (24H). The n:m ratio (1:6) was determined by the integration area of Si—H and Si—CH$_2$-peaks.

EXAMPLE 6

Figure 3:
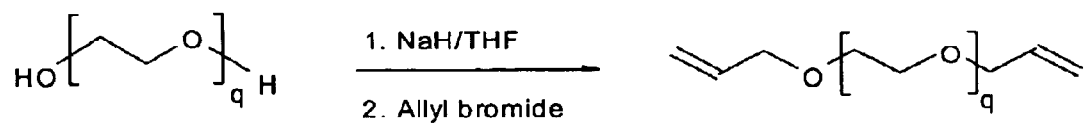
FIG. 3 depicts in schematic form a method of obtaining one type of cross-linking agent.

For Example 6 we created a first cross-linking agent as depicted in FIG. 3. In this regard, to a suspension of NaH (6.8 g, 0.17 mol 20% excess, in 60% mineral oil) in THF (200 mL) was added drop wise to a solution of hexa(ethylene glycol) (20 g, 0.071 mol) in 100 mL THF. After being stirred at room temperature for about 2 hours, the mixture was cooled in an ice bath.

Then allyl bromide (20.4 g, 0.17 mol) was added into the brown mixture over 30 minutes, causing a white precipitate. This mixture was stirred at room temperature for another 2 hours, then heated to 50° C. for about 12 hours. The mixture was filtered and solvent removed under reduced pressure to yield a yellowish oil. The crude material was vacuum distilled to collect the distillate at 170–180° C./10 mm Hg, which was a colorless liquid (yield is ~90%). $^1$H-NMR and $^{13}$C-NMR indicated the correct structure.

EXAMPLE 7

Figure 4:
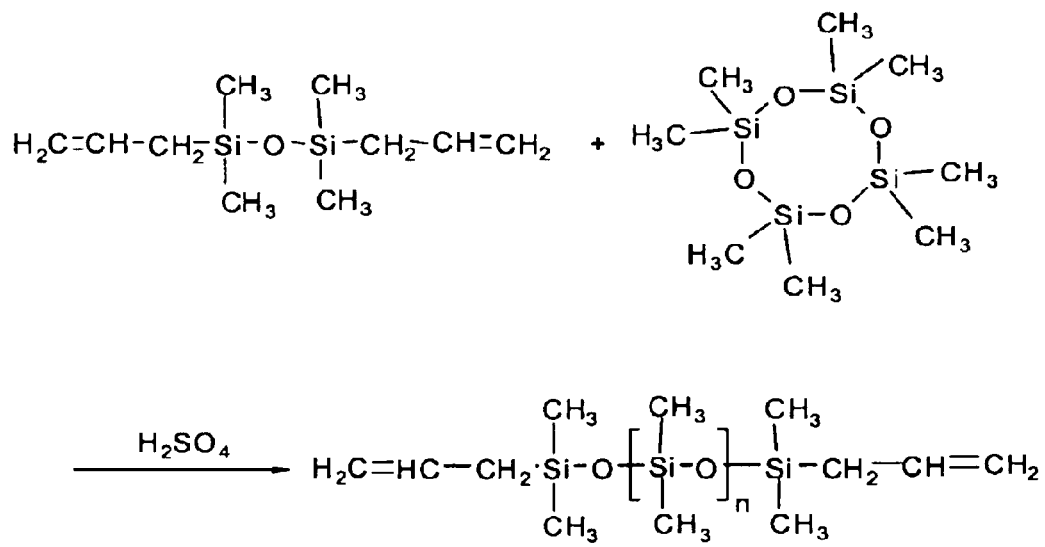
FIG. 4 depicts in schematic form a method of obtaining another type of cross-linking agent.

For Example 7 we schematically depict how one could create the FIG. 4 cross-linking agent by reacting octamethylcyclotetrasiloxane with a precursor in the presence of concentrated sulfuric acid.

EXAMPLE 8

For Example 8 we pipetted a viscous branched polysiloxane precursor (C-PMHS) (1.0 g, 1.7×10$^{-4}$ mol) into an oven dried 10 mL one-neck flask, then added the FIG. 4 diallyl terminated polysiloxane (mw~770) crosslinker (0.0425 g, 3.2 mL of 0.02 g/mL THF solution) and lithium bis(trifluoromethanesulfonyl)imide (LiN(CF$_3$SO$_2$)$_2$) (4.1× 10$^{-4}$ mol, 12.3 mL of 0.0367 mol/L THF solution) by syringing them into the flask. The mixture was stirred vigorously, resulting in a homogenous and colorless THF solution. Afterwards, the resulting solution was put on a high-vacuum line (~10$^{-5}$ torr) for about 24 hours to completely remove the solvent and trace moisture.

The mixture was stirred vigorously, resulting in a homogenous and colorless THF solution. Afterwards, the resulting solution was evacuated on a high-vacuum line (~10$^{-5}$ torr) for about 24 hours to completely remove the solvent and trace moisture. The flask was then transferred into a glovebox filled with pure argon, where the liquid sample was loaded into the conductivity cell. The well-sealed conductivity cell was placed in an oven at 80° C. After about 5 hours a solid polysiloxane film resulted, which showed no Si—H absorption at 2100 cm$^{-1}$ in the FTIR spectrum.

EXAMPLE 9

Figure 5:
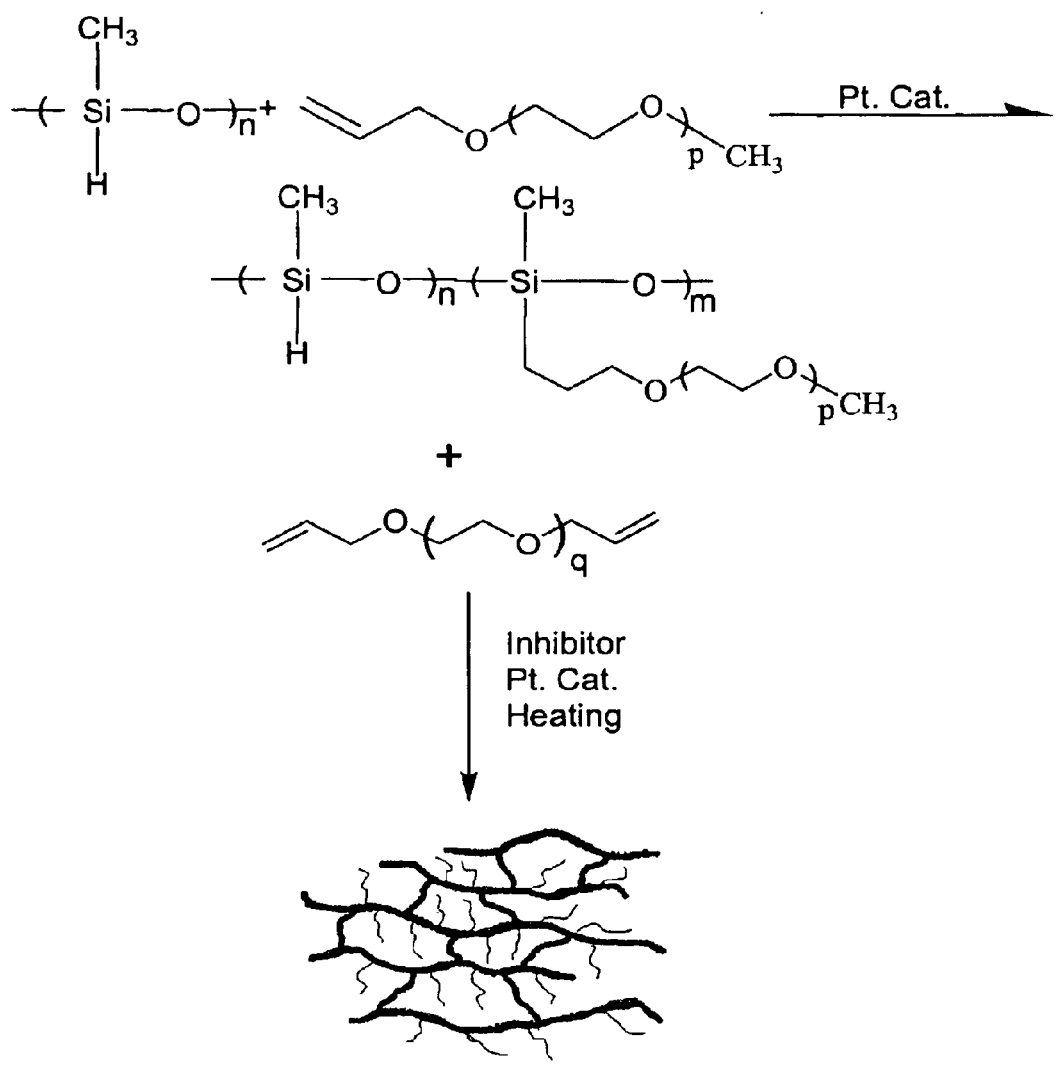
FIG. 5 depicts in schematic form a cross-linking reaction to create a polysiloxane of the present invention.
Figure 6:
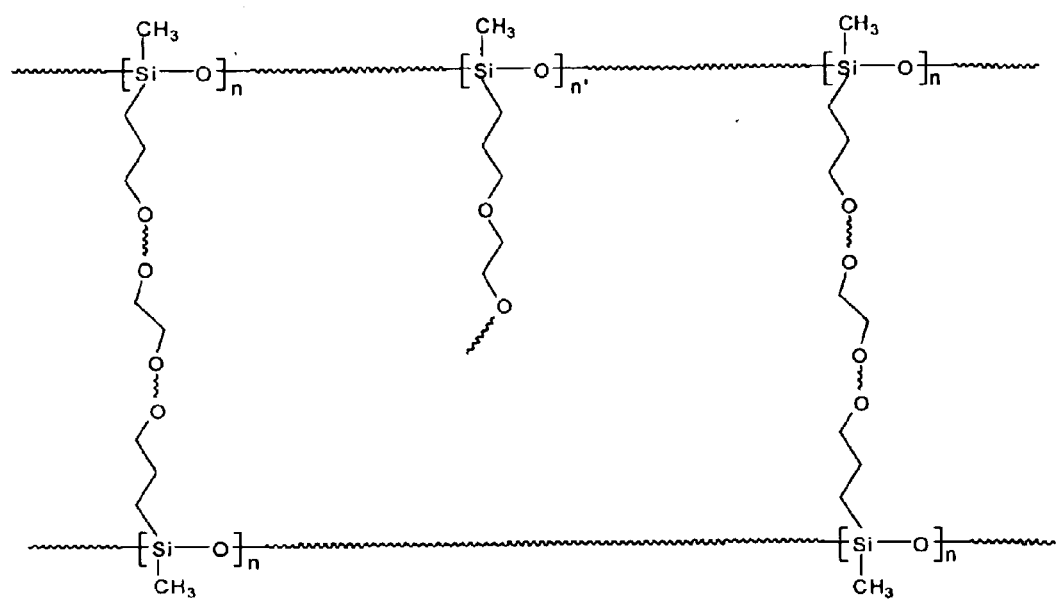
FIG. 6 depicts in schematic form a polysiloxane of the present invention.

For Example 9 we followed the FIG. 5 procedure to create the FIG. 6 compound. We mixed the branched polysiloxane precursor (that has available hydrogen sites for cross-linking) with the cross-linking agent, the catalyst, and the inhibitor. The reaction proceeded at high vacuum. The resulting product was then heated.

As a first example of the FIG. 5 technique we used a branched polysiloxane (C-PMHS) in which the n:m ratio was 1:8 and the n' was 3. With it, we used a cross-linking agent in which the m for the cross-linking agent was about 23.

The viscous branched polysiloxane precursor (0.55 g, 1.6×10–3 mol) was pipetted into an oven dried 10 mL one-neck flask, then diallyl terminated poly(ethylene glycol) (mw~1080) cross-linker (0.136 g, 6.8 mL of 0.02 g/mL THF solution) and lithium bis(trifluoromethanesulfonyl)imide (LiN(CF$_3$SO$_2$)$_2$) (2.78×10$^{-4}$ mol, 7.6 mL of 0.0367 mol/L THF solution) were syringed into the flask.

The mixture was stirred vigorously, resulting in a homogenous and colorless THF solution. Afterwards, the resulting solution was evacuated on a high-vacuum line (~10–5 torr) for about 24 hours to completely remove the solvent and trace moisture. The flask was then transferred into a glovebox filled with pure argon, where the liquid sample was loaded into the conductivity cell. The well-sealed conductivity cell was placed in an oven at 80° C. After about 5 hours a solid polysiloxane film resulted, which showed no Si—H absorption at 2100 cm$^{-1}$ in the FTIR spectrum.

EXAMPLE 10

As a second example of the FIG. 5 technique we used a branched polysiloxane in which the n:m ratio was 1:14 and the n' was 3. With it, we used a cross-linking agent in which the m for the cross-linking agent was about 13.

The viscous branched polysiloxane precursor (0.514 g, $1.74 \times 10^{-3}$ mol) was pipetted into an oven dried 10 mL one-neck flask, then diallyl terminated poly(ethylene glycol) (mw~680) cross-linker (0.0465 g, 2.32 mL of 0.02 g/mL THF solution) and lithium bis(trifluoromethanesulfonyl)imide $(LiN(CF_3SO_2)_2)$ ($2.48 \times 10^{-4}$ mol, 6.75 mL of 0.0367 mol/L THF solution) were syringed into the flask.

The mixture was stirred vigorously, resulting in a homogenous and colorless THF solution. Afterwards, the resulting solution was pulled on a high-vacuum line (~$10^{-5}$ torr) for about 24 hours to completely remove the solvent and trace moisture. The flask was then transferred into a glove-box filled with pure argon, where the liquid sample was loaded into the conductivity cell. The well-sealed conductivity cell was placed in an oven at 80° C. After about 8 hours, a solid polysiloxane film resulted, which showed no Si—H absorption at 2100 $cm^{-1}$ in the FTIR spectroscopy.

EXAMPLE 11

As a third example of the FIG. 5 technique we used a branched polysiloxane in which the n:m ratio was 1:30 and the n was 3. With it, we used a cross-linking agent in which the m for the cross-linking agent was about 13.

The viscous branched polysiloxane precursor (1.0 g, $3.6 \times 10^{-3}$ mol) was pipetted into an oven dried 10 mL one-neck flask, then diallyl terminated poly(ethylene glycol) (mw~680) cross-linker (0.0425 g, 2.1 mL of 0.02 g/mL THF solution) and lithium bis(trifluoromethanesulfonyl)imide $(LiN(CF_3SO_2)_2)$ ($4.76 \times 10^{-4}$ mol, 13.0 mL of 0.0367 mol/L THF solution) were syringed into the flask.

The mixture was stirred vigorously, resulting in a homogenous and colorless THF solution. Afterwards, the resulting solution was put on a high-vacuum line (~$10^{-5}$ torr) for about 24 hours to completely remove the solvent and trace moisture. The flask was then transferred into a glove-box filled with pure argon, where the liquid sample was loaded into the conductivity cell.

The well-sealed conductivity cell was placed in an oven at 80° C. After about 18 hours, a solid polysiloxane film resulted, which showed no Si—H absorption at 2100 $cm^{-1}$ in the FTIR spectroscopy.

While we used $LiN(CF_3SO_2)_2$ as an example lithium salt, it should be appreciated that a variety of other lithium salts should also be useful in connection with our polymers. Examples of suitable salts include, but are not limited to, $LiCF_3SO_3$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, $LiClO_4$, lithium alkyl fluorophosphates, lithium bis(chelato)borates having from seven membered rings and mixtures thereof.

While a wide variety of catalysts might be used to facilitate the reactions, platinum based catalysts are highly preferred. While we prefer Karlstedt's catalyst, other platinum catalysts will likely also be useful such as $H_2PtCl_6$.

We have also learned that certain of the cross-linking reactions proceed so quickly that the viscosity of the resulting liquid may be adversely affected before the material can be positioned in a casting container such as a battery housing. As such, we prefer to also add an inhibitor such as dibutyl maleate to slow the reaction enough to permit handling prior to viscosity changing. It is highly desirable that the final material become a solid when heated to a temperature under 250° C., even more preferably under 100° C.

The mechanical properties of the film membrane which forms can be altered by adjusting the cross-linking density, i.e. the ratio of main chain silicons linked to a cross linker "n" to main chain silicons linked to a oligo(ethylene oxide) side chain "m". For example, in some of our examples the ratio of n:m was 1:30. In others, more cross-linking was present with an n:m ratio of 1:14 or 1:8. Suitable ratios for n:m include, but are not limited to, n:m ratios in a range of 1:4 to 1:200, in a range of 1:4 to 1:100 or in a range of 1:6 to 1:70.

We believe that as more of the silicons become cross-linked (where more than 20% are cross-linked) that the ability of the material to remain a liquid at room temperature may become compromised. Moreover, the cross-linking can begin to adversely affect conductivity. In addition, if much less than 1% are cross-linked the properties of solidification upon heating may be compromised.

Suitable polysiloxane main chains include, but are not limited to, main chains having between 15 and 350 silicons and main chains having between 8 and 300 silicons. Too short of a chain length can compromise conductivity.

In the case of a siloxane cross-linker, the siloxane repeating unit is preferably repeated between 8 and 22 times. Again, the repeating unit is central to the electrical properties of the final compound. The mechanical properties of the membrane can also be altered by adjusting the chain length of the cross-linking agent.

We have conducted conductivity measurements on lithium salt doped films made by the present invention. For example, we determined that several of these tested samples had conductivity almost the same as that of polymers described in U.S. Pat. No. 6,337,383, yet provided the additional benefits of the present invention.

While a number of embodiments of the present invention have been described above, the present invention is not to be considered limited to the specific examples described above. In this regard, there are other modifications that are meant to be within the scope of the invention. For example, it is not critical that the silicons within the main chain that have the hydrogens also have an alkyl group, or that the alkyl group if present be methyl. Further, the terminal units of the chains can be varied as is well known for polysiloxanes. Thus, the claims should be looked to in order to judge the full scope of the invention.

INDUSTRIAL APPLICABILITY

The present invention provides compounds useful for various electrical purposes, such as use as electrolytes in lithium-based batteries.

What is claimed is:

1. A battery, comprising:
   a battery housing; and
   an electrolyte within the housing, the electrolyte including a cross-linked polysiloxane having at least one main chain segment in which a portion of the silicons are each linked to a plurality of side chains that each include an oligo(ethylene glycol) moiety and a portion of the silicons are linked to a cross linker that includes a poly(ethylene glycol) moiety or a polysiloxane moiety.

2. The battery of claim 1, wherein the oligo(ethylene glycol) moiety includes less than 20 ethylene glycol units.

3. The battery of claim 1, wherein the side chains are represented by the following formula: —$(CH_2)_3$—O—$(CH_2CH_2O)_pR_1$, wherein p is at least 2 and $R_1$ is alkyl.

4. The battery of claim 1, wherein the poly(ethylene glycol) moiety in the cross linker has a structure selected from the group consisting of O—(CH$_2$CH$_1$O)$_q$ and the polysiloxane moiety in the cross linker has a structure selected from the group consisting of Si—O—(Si—O)$_k$—Si, wherein q is at least 4 and less than 30 and wherein k is at least 5 and less than 30.

5. The battery of claim 1, further comprising:
a lithium salt mixed with the cross-linked polysiloxane.

6. The battery of claim 5, wherein the polysiloxane includes 20 to 40 repeating ethylene glycol units in the side chains for each lithium cation.

7. The battery of claim 1, wherein m of the silicons in the polysiloxane main chain are linked to a side chain and n of the silicons in the polysiloxane main chain are linked to a cross linker, a ratio of n:m being in a range of 1:6 to 1:70.

8. A battery, comprising:
a battery housing;
an electrolyte within the housing, wherein the electrolyte includes a cross-linked polysiloxane having at least one main chain segment in which a portion of the silicons are each linked to a plurality of side chains, each side chain including an oligo (ethylene glycol) moiety and a portion of the main chain silicons are linked to a cross linker including a moiety selected from the group consisting of O—(CH$_2$CH$_2$O)$_q$ and Si—O—(Si—O)$_k$—Si wherein q is at least 4 and k is at least 5.

9. The battery of claim 8, wherein the cross linker includes a moiety selected from the group consisting of O—(CH$_2$CH$_2$O)$_q$.

10. The battery of claim 8, wherein the cross linker includes a moiety selected from the group consisting of Si—O—(Si—O)$_k$—Si.

11. The battery of claim 8, wherein the cross linker is selected from the group consisting of: —CH$_2$—CH$_2$—CH$_2$—O—(CH$_2$CH$_2$O)$_q$—CH$_2$—CH$_2$—CH$_2$— and —CH$_2$—CH$_2$—CH$_2$—O—Si—O—(Si—O)$_k$—Si—CH$_2$—CH$_2$—CH$_2$—.

12. The battery of claim 8, wherein the oligo(ethylene glycol) has the following formula —(CH$_2$)$_3$—O—(CH$_2$CH$_2$O)$_p$—R$_1$, wherein p is at least 2 and R$_1$ is alkyl.

13. The battery of claim 8, further comprising:
a lithium salt mixed with the cross-linked polysiloxane.

14. A battery made by the method of:
providing an anode;
providing a cathode; and
activating the anode and cathode with an electrolyte including a cross-linked polysiloxane made by the method of:
reacting a polysiloxane with a cross-linking agent; wherein
a portion of the silicons in the polysiloxane main chain are each linked to a plurality of side chains that each include an oligo(ethylene glycol) moiety and a portion of the silicons are linked to a cross linker that includes a poly(ethylene glycol) moiety or a polysiloxane moiety; and wherein
the cross-linking agent includes a moiety selected from the group consisting of: O—(CH$_2$CH$_2$O)$_p$ and Si—O—(Si—O)$_k$—Si wherein q is at least 4 and k is at least 5.

15. A method of providing a battery, comprising:
transporting a polysiloxane and cross-linking agent into a battery housing, wherein
a portion of the silicons in the polysiloxane main chain are linked to at least one hydrogen and a portion of the silicons in the polysiloxane main chain are each linked to a plurality of side chains that each include an oligo (ethylene glycol), and
the cross linking agent includes a poly(ethylene glycol) moiety or a polysiloxane moiety; and
reacting the polysiloxane and cross-linking agent within the battery housing so as to form a solid cross-linked polysiloxane within the battery housing.

16. The method of claim 15, wherein the cross-linking agent includes a moiety selected from the group consisting of: O—(CH$_2$CH$_2$O)$_q$ wherein q is at least 4.

17. The method of claim 15, wherein the cross-linking agent includes a moiety selected from the group consisting of: Si—O—(Si—O)$_k$—Si wherein k is at least 5.

18. The method of claim 15, wherein the cross-linking agent includes two unsaturated carbon-carbon bonds.

19. The method of claim 15, wherein the cross-linking agent is selected from the group consisting of: CH$_2$=CH—CH$_2$—O—(CH$_2$CH$_2$O)$_q$—CH$_2$—CH=CH$_2$ and CH$_2$=CH—CH$_2$—O—Si—O—(Si—O)$_k$—Si—CH$_2$—CH=CH$_2$ wherein q is at least 4 and k is at least 5.

20. The method of claim 15, wherein reacting the polysiloxane and cross-linking agent includes elevating the temperature of the polysiloxane and cross-linking agent within the battery housing to a temperature in a range of 50° C. to 150° C.

21. The method of claim 15, wherein the polysiloxane and cross-linking agent are reacted in the presence of a platinum catalyst.

22. A battery made by the method of claim 15.

23. A method of preparing a battery, comprising:
mixing a polysiloxane and a cross-linking agent,
a portion of the silicons in the polysiloxane are each linked to a plurality of side chains that each include an oligo(ethylene glycol) moiety and a portion of the silicons in the main chain of the polysiloxane are linked to a hydrogen, and
the cross-linking agent including a poly(ethylene glycol) moiety or a polysiloxane moiety.

24. The method of claim 23, wherein the cross-linking agent includes a poly(ethylene glycol) moiety.

25. The method of claim 23, wherein the cross-linking agent includes a polysiloxane moiety.

26. The method of claim 23, wherein the cross-linking agent includes a moiety selected from the group consisting of: O—(CH$_2$CH$_2$O)$_q$ wherein q is at least 4.

27. The method of claim 23, wherein the cross-linking agent includes a moiety consisting of Si—O—(Si—O)$_k$—Si wherein k is at least 5.

28. The method of claim 23, wherein the cross-linking agent is diallyl terminated.

29. The method of claim 23, further comprising:
reacting the polysiloxane and the cross-linking agent so as to form a solid electrolyte.

30. A method of preparing a battery, comprising:
mixing a polysiloxane and a cross-linking agent,
a portion of the silicons in the polysiloxane each being linked to a plurality of side chains that each include an oligo(ethylene glycol) moiety, and
the cross-linking agent including a polysiloxane moiety.

31. The method of claim 30, wherein the cross-linking agent includes a moiety consisting of Si—O—(Si—O)$_k$—Si wherein k is at least 5.

* * * * *